United States Patent [19]

Ball

[11] 4,069,063

[45] Jan. 17, 1978

[54] CEMENT COMPOSITION

[75] Inventor: Frank J. Ball, Charleston, S.C.

[73] Assignee: Westvaco Corporation, New York, N.Y.

[21] Appl. No.: 744,526

[22] Filed: Nov. 24, 1976

[51] Int. Cl.$^2$ ............................................. C04B 7/02
[52] U.S. Cl. ..................................... 106/97; 106/314; 106/315
[58] Field of Search ................... 106/97, 90, 306, 315, 106/314

[56] References Cited

U.S. PATENT DOCUMENTS

| | | | |
|---|---|---|---|
| 1,848,934 | 3/1932 | Case | 106/315 |
| 2,314,188 | 3/1943 | Allen | 106/306 |
| 3,689,294 | 9/1972 | Brunauer | 106/315 |
| 3,960,582 | 6/1976 | Ball et al. | 106/315 |

*Primary Examiner*—J. Poer
*Attorney, Agent, or Firm*—Richard L. Schmalz; Ernest B. Lipscomb, III

[57] ABSTRACT

A portland cement product with or without added gypsum is described in which carbon dioxide gas has been homogeneously reacted with the cement slurry during the water-cement mixing. The use of carbon dioxide in an amount from 0.1% to 6.0% by weight of ground cement controls setting and also results in hydraulic cement mixes which are more stable following hydration. The portland cement mixes of this invention may also include the addition of certain acids or acid/salts in amounts sufficient to improve fluidity and accelerate hydration and hardening of the cement products, in amounts from 0.1% to 5.0% by weight of said ground cement. Lignosulfonates and other water reducers may also be added.

17 Claims, No Drawings

CEMENT COMPOSITION

BACKGROUND OF THE INVENTION

1. Field of the Invention

This invention relates to portland cement compositions with and without added gypsum. More particularly, this invention relates to portland cement compositions and products made therefrom wherein carbon dioxide is added alone or in combination with acids or acid/salts during mixing with water to maintain fluidity of the resulting aqueous cement or concrete slurry, to minimize cement shrinkage during drying and atmospheric carbonation, and to control setting of the cement.

Ground portland cement clinker is universally mixed in the cement plant with about 4% to 8% of finely ground gypsum (calcium sulfate hydrate) to prevent an almost instantaneous thickening of the ground cement particles which would result when water is added. The portland cement mix containing the cement, gypsum, aggregates and about 40 to 85 parts water per 100 parts cement progressively loses fluidity as the cement hydrates, but is suitably handleable for one to several hours. Reduction in water levels results in progressively higher concrete strengths but requires significantly reduced aggregate levels to maintain satisfactory fluidity. The use of added vibration or water reducers such as, lignosulfonates, permits somewhat reduced water levels and thus increased strengths.

The amount of gypsum added is determined by each cement manufacturer to properly control the rate of hydration for its particular chemical composition and fineness. Portland cement specifications, however, limit the amount of gypsum (expressed as $SO_3$) which a cement manufacturer can add, depending somewhat on the chemical composition of its clinker. The manufacturer is not required to add gypsum, but instead is limited in how much can be added; and at present has no feasible alternate. The reason a limitation is put on the upper amount of gypsum which is permitted is that concrete made with too much gypsum instead of shrinking will expand in time and break up.

The added gypsum in portland cement apparently exerts its retarding action by interacting with the tetracalcium aluminate hydrate which immediately forms when water is added to the cement grains. The molar volume of the anhydrous tricalcium aluminate increases four fold in forming the hydrate and doubles again in forming the aluminate trisulfate hydrate complex. This voluminous complex on the surface of the cement grains is believed to slow down the rate of hydration substantially. The hydration does continue slowly, however, and progressively reacts with the remaining soluble gypsum to form more aluminate trisulfate hydrate until within a few hours almost all the gypsum has been reacted. The cement then starts to set as more aluminum hydrate is formed and is released into the solution where it interacts with the aluminate trisulfate hydrate to form the aluminate monosulfate hydrate with less than half the molar volume of the sulfate. These volume changes which occur in forming aluminate trisulfate hydrate can be a factor in increased viscosity of cement slurries and in dimensional changes and cracking in cement products. Thus, it is desirable to find a replacement for gypsum which will improve fluidity, retard setting, and does not result in hydration products of such large volume change.

2. The Prior Art

This invention is to be distinguished from those processes which treat already molded and set cements and concrete products with carbon dioxide primarily for the purpose of accelerating hardening and preventing carbon dioxide shrinkage. It is also distinguished from those processes where hardened and dried concrete products are reacted with carbon dioxide under pressure to obtain higher strength properties. It is also to be distinguished from the reaction of cement compacts containing little or no water which are compressed together at high pressure and then subjected to carbon dioxide under pressure at elevated humidities that develop some internal strength.

It is widely recognized that contamination with just fractions of a percent of alkali metal carbonate when added to gypsum-containing ground portland cement or to the mixing water will result in set up of the fluid cement slurry within minutes after mixing of cement and water. Likewise, atmospheric exposure of ground cement for extended periods at high humidity is known to modify the cement so that it also will lose fluidity shortly after mixing with water. The latter difficulty is related to low level carbonation which can occur on the surface of the cement particles at high humidity.

Since carbonate contamination causes the cement or concrete slurry to become immobile or nearly so within minutes rather than in hours in usual setting up of portland cement and concrete products, the industry takes particular precautions to avoid such contamination. When such contamination occurs and cement and concrete slurries become immobile within minutes, it may be possible with increased mechanical action or dilution to refluidize the concrete and still be able to use it. Such a phenomenon is thus called a "false set" as compared to the normal extended set after which time possible refluidization for use is not feasible.

As it is widely known that false set can result from contamination with alkali metal carbonates or prior atmospheric contamination of cement products and serious operational and handling problems thereby resulted, the portland cement industry has rigorously avoided carbon dioxide and alkali metal carbonates. Only recently has it been demonstrated that if non-gypsum containing portland cement powders were used that the proper combination of sulfonated lignins or lignosulfonates with sodium carbonate (U.S. Pat. No. 3,689,294) or better with sodium bicarbonate (U.S. Pat. No. 3,960,582) permitted the formulation of fluid, very low water cements which resulted in very high strength. No known work has been reported on the beneficial utilization of carbon dioxide during the mixing of portland cement products with or without gypsum.

Whereas it has been known for many years that prior carbon dioxide or carbonate contamination can cause severe problems in mixing and handling fluidity, only in the past ten to twenty years has it become progressively realized that atmospheric carbonation during drying of thin or porous cement and concrete products can be the cause of up to half of the very detrimental shrinkage and cracking previously attributed just to atmospheric drying. The carbon dioxide in the humid atmosphere progressively penetrates cement products during drying and apparently reacts with the calcium hydroxide associated with the calcium aluminate, ferrite, and silicate hydrates and with the free calcium hydroxide crystals. Eventually about 45 parts of carbon dioxide can actually combine with 100 parts of cement. As the carbon dioxide penetrates the cement product, the pH of the cement is progressively lowered from the very alkaline pH 12 – 13 to below pH 10; and the depth penetrated can be determined using phenophthalin indicator solution on a cement section.

In the practice of this invention, the fluid portland cement slurries with and without gypsum present are homogeneously carbonated with generally only about one one-hundredth to one tenth as much carbon dioxide as can actually react with the hydrated cement. With these lower levels of homogeneous carbonation in this invention, the pH of the cement remains about the same as for normal cements.

It is, therefore, the general object of this invention to provide new portland cement compositions.

Another object of this invention is to provide portland cement mixes having a controlled setting time and stabilized upon hydration using carbon dioxide.

A further object of this invention is to provide fluid portland cement mixes with or without added gypsum which are stabilized upon hydration with carbon dioxide and include an accelerator for hardening.

Still another object of this invention is to provide a set regulated portland cement mixture having reduced water requirements and yet remain free-flowing until setting.

Other objects, features and advantages of this invention will become evident from the following detailed description of the invention.

SUMMARY OF THE INVENTION

Carbon dioxide at levels from about 0.1% to about 6.0% of ground cement, preferably 0.3% to about 3.0%, has been found to effectively control setting times of mortars and concrete produced from portland cement. Stabilization of hydrated products, control of setting and reduction in water requirement for fluidity are pertinent improvements compared to the universally used gypsum retarder. Combined carbonation with low levels of various acids or acid-salt accelerators and lignosulfonates provides maximum fluidity and hardening rate.

DETAILED DESCRIPTION OF THE INVENTION

The cements to which this invention is applicable are hydraulic cements of the portland type produced by pulverizing clinkers of hydraulic calcium silicates, tricalcium aluminate, small amounts of other materials and usually containing one or more forms of calcium sulfate (gypsum) as an inter-ground addition. For the purpose of this invention, the cement is used both with and without gypsum. A typical ground portland cement with or without gypsum may, for example, have the following composition:

| TYPICAL COMPOSITION (A.S.T.M. C-150) | |
|---|---|
| Component | Amount, % by Weight |
| tricalcium silicate ($C_3S$) <br> diacalcium silicate ($C_2S$) | 50 – 85 |
| tricalcium aluminate ($C_3A$) | 7 – 15 |
| tetracalcium aluminoferrite ($C_4AF$) | 4 – 8 |
| Additives | 0 – 6 |
| Other | Balance |

Clinkers of the above-described types are typically ground to 2,500 cm.$^2$/gm. and finer, e.g., up to 9,000 cm.$^2$/gm.; but for the purposes of the present invention, the degree of grinding is not believed critical.

To assist in obtaining the desired fineness, it is common practice in the cement industry to employ grinding aids which increase the efficiency of the grinding operations. Satisfactory grinding aids include, among others, water-soluble polyols, such as ethanolamines, ethylene glycols, and polyethylene glycols. The grinding aids are generally added to the clinker in an amount of from 0.005% to 1.0% based on weight of cement, and the ground cement may include a pack set inhibitor. Additional examples of grinding aids may be found in U.S. Pat. Nos. 3,615,785 and 3,689,294. Although grinding aids are typically used in making the cement, they do not form a part of the present invention.

The portland cements of the present invention thus start with a ground portland cement with or without added gypsum. In its broadest concepts, sufficient water is added to the cement to effect hydraulic setting (hydration). Normally, this is in an amount from 40 to 85 parts water per 100 parts ground cement clinker. At least a sufficient amount of carbon dioxide is added with the water to maintain fluidity and control setting for a reasonable period of time, say 1 – 6 hours. Another important function of the carbon dioxide is to stabilize the tricalcium aluminate upon its hydration by formation of aluminate monocarbonate hydrate. The amount of carbon dioxide to be added is usually from about 0.1% to 6.0% by weight of cement, preferably from about 0.3% to about 3.0%. Suitable amounts of aggregate, such as sand, gravel and the like, are also added. It should be understood that only low levels of carbon dioxide can be dissolved in the water to be added to cement; but on mixing with cement, the interstitial water becomes very alkaline from dissolved sodium, potassium and calcium hydroxides; and this aqueous cement slurry readily dissolves the required carbon dioxide. Carbon dioxide dissolution is also promoted by the usual cement slurry agitation.

In another embodiment of this invention, certain acids and their salts are added to the carbon dioxide-treated aqueous cement slurry. These acids and their salts are added in an amount sufficient to accelerate hydration of the tricalcium silicate and dicalcium silicate, which together comprise 50% to 85% of the ground cement. The acids and their salts are added in an amount from about 0.1% to 5.0% by weight of said ground cement. Their incorporation into the aqueous cement slurry along with carbon dioxide improves fluidity of the slurry. The acids and their salts contemplated for use in combination with the carbon dioxide include calcium chloride, magnesium chloride, hydrochloric acid, sulfuric acid, phosphoric acid and nitric acid. These acids and acid salts are effective in conjunction with carbon dioxide when used both individually and in combination.

It is desirable to reduce the water needed for a mix to obtain high strengths yet have the mix remain fluid until it sets. Therefore, in yet another embodiment, to the carbon dioxide-treated cement is added a sufficient amount of water reducer to reduce the water and yet have the mix remain fluid. Water reducers contemplated for use in this invention include lignosulfonates, sulfonated lignins, hydroxy carboxylic acids, melamine sulfonates, and naphthalene sulfonates, with the lignins being preferred. The amount of water reducer added will, of course, depend upon the particular composition of the cement; but in most cases, the amount is from 0.1% to about 3.0%, preferably 0.3% to 0.8%.

The lignosulfonates are obtained as by-products from sulfite pulping of woody materials. The waste liquors from such pulping contain large quantities of lignin and lignin products in conjunction with other materials. The sulfonated lignins, on the other hand, are produced by reacting lignins obtained from alkali pulping, acid hydrolysis or other known recovery process with an inorganic sulfite, e.g., sodium sulfite, whereby sulfonate groups are added to the lignin. For use in this invention, any of the various water-soluble sulfonated lignins or lignosulfonates may be employed. It is preferable, however, to utilize sulfonated lignins which are free of carbohydrate materials. Sulfonated lignins obtained from reaction of sulfites with alkali lignin do not contain any appreciable amounts of these carbohydrates and consequently may be employed as is. The sulfonated lignins may be converted into water-soluble alkaline earth salts, and used as such, as disclosed in U.S. Pat. No. 2,141,570. For the purpose of this invention, the term "lignosulfonate" is intended to include "sulfonated lignins".

It is believed important to the full understanding of the significance of this invention that the following theory of the probable reactions which are believed to occur during both gypsum and carbon dioxide hydration of tricalcium aluminate be explained. Tricalcium aluminate ($C_3A$) very rapidly hydrates and interacts with the calcium hydroxide (CH) resulting from tricalcium silicate hydration to form $C_3A.CH.H_{18}$. When lignosulfonates are present, this hydrate is believed to rapidly adsorb all the lignosulfonate even if added to levels greatly over that being considered. The added carbon dioxide ($\bar{C}$), however, avoids this adsorption by converting the reactive tricalcium aluminate hydrate ($C_3A.CH.H_{18}$, molar volume 369) to the stable aluminate monocarbonate hydrate ($C_3A.C\bar{C}.H_{11}$, molar volume 265) which no longer avidly adsorbs lignosulfonate. This aluminate monocarbonate hydrate tends to form a protective coating which slows down hydration of the anhydrous $C_3A$. This is similar to the retardation resulting from the formation of the aluminate trisulfate hydrate coating on $C_3A$ when using gypsum retardation. If lignosulfonate is present, it apparently adsorbs on the surface of the calcium silicate particles retarding their hydration and dispersing them. Residual carbonate in the water slurry will continue to form additional aluminate monocarbonate hydrate coating, if the disruption of the coating from slow formation of tricalcium aluminate hydrate requires this. Essentially similar reactions will occur with the hydrated aluminate and ferrites which are formed as the tetracalcium aluminate ferrite ($C_4AF$) portion of the cement hydrates.

In gypsum retardation, the tricalcium aluminate hydrate ($C_3A.CH.H_{18}$) is doubled in molar volume by formation of tricalcium aluminate trisulfate hydrate ($C_3A.(CS)_3.H_{32}$) which often crystallizes as large needles projecting from the particle surface. In contrast, the conversion of tricalcium aluminate hydrate ($C_3A.CH.H_{18}$) to tricalcium aluminate monocarbonate hydrate ($C_3A.C\bar{C}.H_{11}$) reduces the tricalcium aluminate hydrate volume by one-fourth, and crystallizes as flat plates on the surface. Since the long aluminate trisulfate hydrate crystals, which are the first formed in the paste slurry, are believed to be a major factor in particle to particle contact, the smaller, flat crystals formed in carbonate retardation could be a factor in the low water levels tolerated with satisfactory fluidity.

The lignosulfonates, if present, tend to remain in solution since the tricalcium aluminate hydrate is made non-adsorptive by reaction with the carbon dioxide; and the lignosulfonate is then reversibly adsorbed on the hydrating layers of the $C_3S$ and $C_2S$. This lignosulfonate coating apparently slows down the hydration of the calcium silicates and during the dormant period effectively disperses the silicate particles in the water system. The lignosulfonate also would be expected to retard incipient crystallization of the calcium hydroxide or the calcium silicate from solution. This tendency to inhibit crystallization may be a significant factor in retarding hydration, since in hydrating of silicates or cement, the hydration proceeds at a slow rate until calcium hydroxide starts crystallizing and then markedly speeds up.

Thus, by adding more lignosulfonate or by doing a more effective or earlier job of converting tricalcium aluminate hydrate to tricalcium aluminate monocarbonate hydrate, the lignosulfonate level in solution is raised. Inhibition of crystallization and increased lignosulfonate adsorption on the 50% to 85% of cement which is calcium silicate can hold the hydration in check to the extent desired.

The success of the portland cements of this invention is also believed predicated on the following theory. In gypsum-free portland cement, the carbon dioxide going in solution will react with any calcium hydroxide in solution and precipitate calcium carbonate markedly lowering the calcium ($Ca^{++}$) ion concentration to levels which can cause the electrical charge on the silicates to change from positive or near neutral to negative. The excess carbonate ions ($CO_3^=$) would likely increase the negative charge and could promote good dispersion and fluidity. Apparently, when the available carbonate in the slurry is finally consumed and is no longer available to react with the tricalcium aluminate hydrate or soluble calcium ions, the still fluid cement slurry undergoes a dramatic change in just a few minutes by conversion to a breakable semi-solid. This may be due to an abrupt change in electrical charge on the cement particle. At the same time, there is a quick small rise in temperature, and if lignosulfonate is present, it is all adsorbed from solution presumably by the no longer retarded fresh tricalcium aluminate hydrate. This abrupt stiffening is in contrast to gypsum retarded cements where the cement or concrete slurry progressively thickens until it will no longer flow.

Gypsum retarded cement slurries are reported to be positively charged, and one possible reason that contamination with carbon dioxide or alkali metal carbonates causes severe thickening of cement slurries to immobility within minutes may be that the carbonate ions precipitate soluble calcium ions and thus promote a shift from electropositive dispersion of the cement grains to neutral coagulation. It has now been discovered that carbon dioxide gas dissolving in gypsum retarded fluid cement slurries at normal water content will rapidly cause severe thickening at low levels of carbon dioxide; but with increased levels of carbon dioxide, cement slurries can be produced which are more fluid than without carbon dioxide. Cement products can thus be produced with or without gypsum which can have varying levels of carbonate compounds homogeneously distributed throughout the structure.

Whereas carbon dioxide will react with tricalcium aluminate hydrate to form tricalcium aluminate hydrate monocarbonate, additional levels of carbon dioxide can react with the progressively more inert anhydrous tricalcium silicate and dicalcium silicate, and thereby accelerate silicate hydration. With higher levels of carbon dioxide, it is thus feasible to accelerate hardening significantly; and the resulting high temperatures of reaction should also accelerate hydration and hardening.

The practice of this invention may clearly be seen in the following examples.

EXAMPLE 1

This example illustrates the effects on the hydraulic properties of cement slurries and the length of time to initial set, as well as, the strength properties and drying shrinkage properties of the resulting cured cement products, when carbon dioxide gas is reacted with a non-gypsum containing portland cement during mixing. Portland cement, Type I clinkers were ground in a cement plant mill without gypsum to 5,500 and to 4,400 Blaine (cm.$^2$/gm.) fineness.

In laboratory studies, the ground cement was added to a polyethylene bag, the air displaced and the bag filled with carbon dioxide gas. The neck of the bag was squeezed down until it retained the desired content of carbon dioxide gas and then opened just sufficiently to pour in the proper ratio of water and the opening immediately sealed off. The bag then containing the mixture of cement, water and carbon dioxide gas was immediately shaken and progressively and completely collapsed as the carbon dioxide gas dissolved and reacted with the alkaline cement slurry over a period of about 2–4 minutes. The temperature of the cement paste rose from the heat released as the anhydrous cement grains hydrated, and additional heat was produced by the heat of neutralization as carbon dioxide was converted to carbonates. After all carbon dioxide had dissolved and the temperature stopped rising, the cement paste was cooled to 25° C. to measure the fluidity using a Stormer viscometer. The fluid paste was then poured into 1-inch cubes for curing and compressive strength tests and the time to initial set measured with a Vicat apparatus.

Additional paste was poured into a mold making six duplicate ¼ × ¼ × 3 inches cement bars with metal screws in the ends for precise length measurements with a micrometer on drying after preliminary curing for 21 days at 100% relative humidity in a closed container. These bars were further dried under vacuum at 54% relative humidity until shrinkage essentially stopped, i.e., 2–3 months. This procedure for measuring shrinkage of cured cement paste samples was developed by Roper (Harold Roper – Research Report No. R 181, University of Sydney (1971)) and has been shown to give startlingly good correlation between short term cement paste shrinkage values and long term shrinkage of concrete products. To get an indication of the shrinkage likely from atmospheric carbonation of porous or thin cement products, the samples were exposed to carbon dioxide gas at atmospheric pressure and 54% R.H. in closed containers for two weeks and the additional shrinkage measured.

The effects of reacting varying levels of carbon dioxide during the mixing of the 5,500 Blaine cement with 60 and 40 parts of water per 100 of cement are shown in Table I. The considerable beneficial effect of slurry carbonation on drying shrinkage and subsequent carbonation shrinkage is quite evident as are the effects on flow, set and strength.

TABLE I

| Water to Cement Ratio | CO$_2$ % | Fluidity$^a$ | Initial Set, hrs. | Compressive Strength, psi. 1 Day | Compressive Strength, psi. 7 Days | Drying Shrinkage, % | Additional Carbonation Shrinkage, % |
|---|---|---|---|---|---|---|---|
| 0.6 | 0 | >525$^b$ | 8¼ | 400 | 1,950 | 0.885 | 0.615 |
| 0.6 | 0.3 | 125 | 5¾ | 700 | 1,600 | 0.801 | 0.165 |
| 0.6 | 0.8 | 350 | 4¾ | 700 | 2,850 | 0.678 | 0.168 |
| 0.6 | 1.6 | 250 | 5 | 500 | 3,700 | 0.549 | 0.233 |
| 0.6 | 3.2 | 400 | 7 | 400 | 3,400 | 0.499 | 0.407 |
| 0.4 | 0 | —$^b$ | —$^c$ | 800 | 7,650 | 0.410 | —$^c$ |
| 0.4 | 0.5 | —$^b$ | —$^c$ | 4,300 | 9,450 | 0.345 | 0.082 |
| 0.4 | 3.3 | —$^b$ | —$^c$ | 1,050 | 8,930 | 0.377 | 0.019 |

Notes:
$^a$Stormer Flow - Mass in grams for first movement.
$^b$Too viscous to measure accurately.
$^c$Not measured.

The cement clinker ground without gypsum to 4,400 Blaine (cm.$^2$/gm.) fineness was also tested, and the results are shown in Table II. This coarser cement when homogeneously reacted with carbon dioxide at 0.6 water-to-cement ratio gave decided reductions in set time at progressively higher carbon dioxide levels. The heat released in the cement paste from carbon dioxide neutralization was 10°–15° C. with each 1.6% CO$_2$ reacted, but temperature rise in this study was minimized by cooling to 25° C. after each 1.6% CO$_2$ addition. With these coarser cements, the 6.4% CO$_2$ sample gave a Stormer flow at 125 grams; and the other samples required only 50 grams with some reduction in fluidity with increasing carbon dioxide.

TABLE II

| CO$_2$ % | Initial Set, hrs. | Compressive Strength, psi. 1 Day | 7 Days | 28 Days | 56 Days | Drying Shrinkage, % | Additional Carbonation Shrinkage, % |
|---|---|---|---|---|---|---|---|
| 0 | 11 | 400 | 2,350 | 5,600 | 6,350 | 0.91 | 0.43 |
| 1.6 | 7¼ | 700 | 2,800 | 6,400 | 7,350 | 0.64 | 0.66 |
| 3.2 | 4 | 650 | 1,600 | 4,960 | 5,450 | 0.53 | 0.27 |
| 6.4 | 1 | 500 | 1,950 | 5,330 | 6,800 | —$^a$ | —$^a$ |

Notes:
$^a$not measured.

The results in Table II show clearly that the homogeneous addition of carbon dioxide to the aqueous cement slurry effectively controls the time to initial set without adversely effecting the strength of the cement product. Also, the shrinkage of the products is reduced with added carbon dioxide.

For comparison, the addition of optimum levels of gypsum (3% SO$_3$) to the same portland Type I cement ground to 4,400 Blaine at water ratio of 0.6 instead of carbon dioxide resulted in vacuum drying shrinkages at 55% R.H. of 0.3–0.4%. Subsequent exposure to atmospheric carbon dioxide for two weeks brought about additional shrinkage of 0.7%.

EXAMPLE 2

The addition of carbon dioxide to a portland clinker ground without added gypsum in combination with low levels of mineral acids markedly improves the fluidity and accelerates the hardening rate of the cement slurry. In contrast, the addition of low levels of mineral acids, such as 0.5% of sulfuric acid to gypsum retarded cement slurries, will decidedly worsen fluidity. The water-to-cement ratio was 0.6, and the same clinker in Example 1 ground to 5,500 Blaine (cm.$^2$/gm.) was used. The results are shown in Table III.

TABLE III

| Acid | | $CO_2$ | | Initial | Compressive Strength, psi. | |
|---|---|---|---|---|---|---|
| Type | % | % | Fluidity[a] | Set, hrs. | 1 Day | 7 Days |
| None | 0.0 | 1.6 | 250 | 5 | 500 | 3,700 |
| HCl | 0.14 | 1.6 | 100 | 10 | 700 | 2,500 |
| HCl | 0.7 | 1.6 | 75 | 5 | 1,050 | 5,100 |
| $H_2SO_4$ | 0.5 | 1.6 | 100 | 6¾ | 300 | 5,050 |
| $H_2SO_4$ | 1.2 | 1.6 | 75 | 5¼ | —[b] | 6,000 |
| $H_2SO_4$ | 0.5 | 1.6 | 50 | 4 | 1,500 | 6,900 |
| HCl | 0.7 | | | | | |
| $H_3PO_4$ | 0.7 | 1.6 | 125 | 9 | 500 | 3,350 |
| $HNO_3$ | 2.0 | 1.6 | 150 | 6¼ | 3,200 | —[b] |

Notes
[a]Stormer Viscometer - Mass in grams for first movement.
[b]Not measured.

For comparison, when this same cement powder was ground with 6.25% gypsum (2.9% $SO_3$) and mixed with 0.60 water-to-cement ratio, it exhibited a Stormer flow of 125 grams, an initial set of 8 hours, and compressive strength at 1 day and 7 days of 1,150 psi. and 5,500 psi., respectively.

EXAMPLE 3

The addition of $CaCl_2$ which is ordinarily used in cement for accelerating hardening has likewise been found to be an effective accelerator in combination with $CO_2$. Also, $MgCl_2$ or $MgCl_2$ in combination with $CaCl_2$, such as occurs in natural brines, both accelerate the hardening and can improve the fluidity. These salts were added to a carbonated slurry of gypsum-free portland (Type I) cement ground to 5,500 Blaine (cm.$^2$/gm.) and made at a water-to-cement ratio of 0.6. The results are shown in Table IV.

EXAMPLE 4

The capability of carbon dioxide, when in combination with water reducers such as sulfonated lignins, to retard and promote the fluidity of a 5,500 Blaine non-gypsum containing cement at very low water contents is illustrated. When 0.5% carbon dioxide gas was reacted with a 0.25 water/cement slurry which contained 0.9% sulfonated lignin based on cement, a fluid pourable paste was formed which did not appear to change in fluidity or temperature for 80 minutes. In the succeeding 5-minute period, the fluid paste stiffened to a hard solid which could be broken into pieces. A comparable level of 0.9% calcium lignosulfonate dispersant from sulfite waste liquor and 0.5% carbon dioxide with the same cement and water ratio also produced a fluid paste which remained fluid for 40 minutes before setting. In contrast, this cement at the same water-to-cement ratios and with 0.9% sulfonated lignin without added carbon dioxide completely set up before fluidizing. Doubling the sulfonated lignin to 1.8% formed a fluid paste but set within 5 minutes.

When only 0.45% of sulfonated lignin was used with carbon dioxide, the wet mix containing only 0.25 water-to-cement ratio tends to thicken too much during mixing making it difficult to dissolve the gaseous carbon dioxide in the low water mix in time. If 0.17% sodium bicarbonate was added in the mixing water to supply some initial stabilizing carbonate ions, then carbon dioxide could be dissolved during mixing, producing a fluid paste which sets in 11 minutes when 0.14% $CO_2$ had been dissolved during mixing, and in 28 minutes when 0.18% $CO_2$ was dissolved during mixing. Paste cubes from these two mixes exhibited one-day and seven-day compressive strengths of 5,600 and 17,300 psi. for the

TABLE IV

| Salt | | $CO_2$ | | Set Hard, | Compressive Strength, psi. | |
|---|---|---|---|---|---|---|
| Type | % | % | Fluidity[a] | hrs. | 1 Day | 7 Days |
| None | | 1.6 | 250 | 5 | 500 | 3700 |
| $CaCl_2$ | 1.1 | 1.6 | 300 | 5 | 1,200 | 5,400 |
| None | | 3.2 | 400 | 7 | 400 | 3,400 |
| $CaCl_2$ | 1.1 | 3.2 | 425 | 5 | 2,300 | 5,700 |
| $MgCl_2$ | 1.0 | 1.6 | 50 | 7 | 1,200 | 4,450 |
| $MgCl_2$ | 1.0 | 1.6 | 75 | 6 | 1,800 | 5,150 |
| $CaCl_2$ | 0.6 | | | | | |
| $MgCl_2$ | 1.0 | 3.2 | 400 | 6 | 550 | 4,300 |
| $CaCl_2$ | 0.6 | | | | | |

Note
[a]Stormer Viscometer - grams to first movement.

The results in Table IV show that the addition of salts in combination with carbon dioxide acts to accelerate hardening.

sample with 0.14% $CO_2$ and 4,300 and 15,000 psi. for the sample containing 0.18% $CO_2$. It was also observed that the time of the fluid dormant period can be further extended, if desired, by later dissolving additional gaseous carbon dioxide in the still fluid paste.

EXAMPLE 5

The utilization of carbon dioxide in combination with sodium bicarbonate minimizes the increase in alkali content of high strength cement formulations using only alkali carbonates and bicarbonates, and thereby reduces alkali attack which can give detrimental expansion of certain sensitive aggregates. The reduction in expansion of high strength cement-pyrex glass formulations containing sulfonated lignin with sodium bicarbonate or reduced sodium bicarbonate and carbon dioxide is illustrated in Table V. Pyrex glass is used to experimentally simulate sensitive aggregates according to A.S.T.M. C-227. The same 5,500 Blaine cement was used.

TABLE V
ALKALI EXPANSION OF LOW POROSITY CEMENT-PYREX GLASS FORMULATIONS
Water-to-Cement = 0.275,
Pyrex Glass/Cement = 1.80,
0.45% Sulfonated Lignin

| Carbonate Type | % | Compressive Strength, psi. 7 Days | Expansion, % 14 Days | 56 Days | 90 Days |
|---|---|---|---|---|---|
| $NaHCO_3$ | 0.60 | 11,500 | 0.15 | 0.23 | 0.23 |
| $NaHCO_3$ / $CO_2$ | 0.10 / 0.47 | 11,450 | 0.13 | 0.17 | 0.17 |

EXAMPLE 6

Portland cements containing the normal content of gypsum retarder, when mixed with the usual amount of water, i.e., 0.4 - 0.6 water-to-cement ratio, gave fluid pastes which maintain fluidity for an hour or more. When the fluid cement was mixed with carbon dioxide gas by shaking in a polyethylene bag, the paste thickened and lost fluidity when only one to two parts by weight of carbon dioxide were dissolved per thousand parts of cement. On standing, the cement tended to regain fluidity in about a quarter hour but relost fluidity on exposure to another small addition of carbon dioxide. Thus, fractions of a percent of carbon dioxide gas caused normal gypsum containing cements to lose fluidity and the amount required varied with the cement composition and fineness of the cement particles.

Higher levels of dissolved carbon dioxide, such as around one or more parts per 100 parts of gypsum containing cement, produced fluid cement slurries with fluidities comparable or, in some cases, more fluid than the usual gypsum containing cement slurry. The fluid viscosity (in centipoise), set time, and cured compressive strength of a 0.4 water-to-cement ratio gypsum containing portland (Type I) cement with progressive addition of carbon dioxide is given in Table VI.

TABLE VI

| $CO_2$ % | Viscosity, cps. | Initial Set, hrs. | Compressive Strength, psi. 1 Day | 7 Days | 28 Days |
|---|---|---|---|---|---|
| None | 1,080 | 3.5 | 1,400 | 8,250 | 11,380 |
| 0.20 | False Set | —* | —* | —* | —* |
| 0.30 | False Set | —* | —* | —* | —* |
| 0.80 | 770 | 4.0 | 2,100 | 9,250 | 11,850 |
| 1.50 | 1,040 | —* | 1,100 | 7,900 | 10,750 |

Notes:
*Not measured.

This tendency for low levels of carbon dioxide to cause gypsum containing cement to lose fluidity and at higher levels to produce a fluid cement slurry was also evident in Example 7 wherein larger batches of portland cement (Type I) were mixed with water and carbon dioxide in a concrete mixer.

EXAMPLE 7

A useful approach for maximizing fluidity was achieved by the addition of successive batches of water, cement and carbon dioxide to a residual portion of an already carbonated cement batch. In this semi-continuous approach, the slurry already has carbonate ions in solution to instantly react with any tricalcium aluminate hydrate formed on mixing in additional cement and water. The interstitial water is also already at high pH and thus readily dissolves the desired additional carbon dioxide.

A tilted drum cement mixer having an operating capacity of 2.5 cubic feet was modified to prepare carbonate cement slurries in a batched semi-continuous manner. This mixer was fitted with a cover plate which contained appropriate parts, fittings, valves, etc. to allow the addition of cement, water and the introduction of a gas stream beneath the surface of the slurry in the mixer. This cover was fitted with a suitable gasket so that an atmosphere of $CO_2$ could be maintained over the mixer contents during the mixing operation. Operation normally started with displacement of the air in the mixer with $CO_2$ and addition of three successive 50-pound batches of ground cement and the desired ratio of water to the rotating drum mixer. Carbon dioxide was added at a sufficient rate to maintain a slight overpressure and displaced interstitial air. Samples of carbonated cement paste slurry were taken at intervals and rapidly analyzed for carbonate content by acidification of the weighed paste samples with hydrochloric acid and volumetrically determining the quantity of $CO_2$ evolved. The desired degree of slurry carbonation was thus attained in a uniform and homogeneous manner with carbonate values of about 1.5% $CO_2$ based on the dry weight of cement being achieved. Carbonation of successive 50-pound cement batches in the modified drum mixer generally required about 10 to 15 minutes and resulted in a temperature rise of approximately 10° C. to 15° C. (18° F. to 27° F.).

Weighted portions of the fluid cement paste of the desired carbonate content were dumped into a second mixer and combined with sand and aggregate for the preparation of mortar and concrete using conventional equipment. Additional quantities of water and dry cement were added to the remaining carbonated slurry and the whole batch carbonated to the desired level as described above.

This semi-continuous batch-wise method of carbonated cement slurry preparation was found to successfully overcome the false setting characteristics normally encountered in portland cement systems upon exposure to low levels (a few tenths of a percent) of carbonate.

A fluid 0.4 water-to-cement ratio slurry of Type I portland cement (which contained the usual gypsum content) when exposed to a carbon dioxide atmosphere while being agitated in the modified cement mixer underwent false set and plastered the sides of the rotating mixer in the first few minutes. This same cement mix became very fluid when higher levels of carbon dioxide were dissolved and successive fluid batches of the same cement at 0.4 water-to-cement ratio were mixed at around 1.0% reacted carbon dioxide.

Mortar and concrete batches were prepared by combining the carbonated cement pastes with the desired quantity of sand, and sand and aggregate, respectively, using some form of suitable conventional cement and concrete mixer. Additionally, as noted above, the modified drum cement mixer was provided with a port in which sand and aggregate could be introduced to prepare a carbonated mortar or concrete "in situ" if so desired. The properties of selected mortars and concretes prepared using carbonated slurries of a commercial Type I portland cement and a gypsum-free Type I clinker ground to 5,500 Blaine are given in Table VII.

TABLE VII

Properties of Mortar and Concrete Samples Prepared from Carbonated Pastes

MORTAR

| s/c = 2.75 Cement | $CO_2$, % | w/c | Flow, % | Set Time, hrs. | Compressive Strength, psi. | | | |
|---|---|---|---|---|---|---|---|---|
| | | | | | 1 Day | 7 Days | 28 Days | 56 Days |
| Type I Portland Gypsum-Free | 1.2 | 0.46 | 56 | 4.5 | 1,660 | 5,900 | 9,160 | 10,050 |
| Type I Clinker Gypsum-Free | 1.8 | 0.65 | 107 | 6.5 | 260 | 2,940 | 4,040 | 4,890 |
| Type I Clinker (2.2% $CaCl_2$ added) | 18 | 0.65 | 122 | 3.5 | 2,190 | 4,480 | 5,370 | 5,360 |

CONCRETE

| Cement | $CO_2$, % | w/c | A/C | Slump, cm. | Compressive Strength, psi. | | | |
|---|---|---|---|---|---|---|---|---|
| | | | | | 1 Day | 7 Days | 28 Days | 56 Days |
| Type I Portland Gypsum-Free | 1.2 | 0.56 | 5.9 | complete | 740 | 2,410 | 3,430 | 4,480 |
| Type I Clinker Gypsum-Free | 1.6 | 0.69 | 5.9 | complete | 1,900 | 3,270 | 4,020 | 4,320 |
| Type I Clinker (0.72% HCl added) | 2.0 | 0.67 | 6.0 | 9 | 1,750 | 2,510 | 4,240 | 4,570 |

Notes:
s/c = pounds sand per pound cement.
A/C = pounds aggregate per pound cement.
Slump = measured by A.S.T.M. C-143.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A portland cement mix comprising, a ground portland cement with or without added gypsum, aggregate, sufficient water to effect hydraulic setting of the cement, and having added thereto carbon dioxide in an amount sufficient to control setting of the mix and stabilize the hydrated cement.

2. The portland cement mix according to claim 1 wherein said carbon dioxide is added in an amount from about 0.1% to 6.0% by weight of said ground portland cement, and said portland cement is ground without added gypsum.

3. A portland cement mix comprising;
   a ground portland cement with or without added gypsum, aggregate, sufficient water to effect hydraulic setting of the cement,
   having added thereto carbon dioxide in an amount sufficient to control setting of the mix and stabilize the hydrated cement, and
   having added thereto an acid or acid-salt in an amount sufficient to accelerate hydration of the silicates.

4. The portland cement mix according to claim 3 wherein said carbon dioxide is added in an amount from about 0.1% to 6.0% by weight of said ground portland cement, said portland cement is ground without added gypsum.

5. The portland cement mix according to claim 4 wherein said acid or acid-salt is a member of the group consisting of calcium chloride, magnesium chloride, hydrochloric acid, sulfuric acid, phosphoric acid, nitric acid and mixtures thereof.

6. The portland cement mix according to claim 5 wherein said acid or acid-salt is added in an amount from about 0.1% to 5.0% by weight of said ground portland cement and said carbon dioxide is added in an amount from about 0.3% to about 3.0% by weight of said ground portland cement.

7. A portland cement mix including a ground portland cement with or without added gypsum, aggregate, sufficient water to effect hydraulic setting of the cement, and have added thereto the following;
   a. carbon dioxide in an amount sufficient to control setting of the mix and stabilize the hydrated cement,
   b. an acid or acid-salt in an amount sufficient to accelerate hydration of the silicates, and
   c. a water-reducer in an amount sufficient to reduce the water needed to effect hydraulic setting.

8. The portland cement mix according to claim 7 wherein said carbon dioxide is added in an amount from about 0.1% to 6.0% by weight of said ground portland cement, said portland cement is ground without added gypsum, and said water-reducer is a lignosulfonate.

9. The portland cement mix according to claim 8 wherein said carbon dioxide is added in an amount from 0.3% to 3.0% by weight of said cement.

10. The portland cement mix according to claim 8 wherein said acid or acid-salt is a member of the group consisting of calcium chloride, magnesium chloride, hydrochloric acid, sulfuric acid, phosphoric acid, nitric acid and mixtures thereof.

11. The portland cement mix according to claim 10 wherein said acid or acid-salt is added in an amount from about 0.1% to 5.0% weight of said ground portland cement, and wherein said lignosulfonate is added in an amount from about 0.1% to 3.0% by weight of said ground portland cement.

12. The portland cement mix according to claim 1 wherein said ground portland cement includes tricalcium aluminate which is stabilized by the added carbon dioxide yielding a cement mix with improved fluidity and setting characteristics.

13. The portland cement mix according to claim 3 wherein said ground portland cement includes tricalcium aluminate which is stabilized by the added carbon dioxide yielding a cement mix with improved fluidity and setting characteristics.

14. The portland cement mix according to claim 7 wherein said ground portland cement includes tricalcium aluminate which is stabilized by the added carbon dioxide yielding a cement mix with improved fluidity and setting characteristics.

15. The method for making cementitous articles comprising the steps:

a. mixing predetermined quantities of ground portland cement which include tricalcium aluminate with water to form a hardenable, fluid slurry;

b. contacting the fluid slurry with at least 0.1 percent gaseous carbon dioxide (by weight of the portland cement) to control the fluidity characteristics of the slurry and to retard setting of the cement; and c. casting the slurry into an article having improved dimensional stability after setting.

16. The method according to claim 15 wherein carbon dioxide is added in an amount from about 1.0 percent to 6.0 percent by weight of the portland cement.

17. The method according to claim 16 further including the steps of adding to said mix an acid or acid-salt in an amount sufficient to accelerate hydration, and also adding a water-reducing agent comprising a lignosulfonate in an amount sufficient to reduce the water necessary to effect setting.

* * * * *

UNITED STATES PATENT OFFICE
CERTIFICATE OF CORRECTION

PATENT NO. : 4,069,063
DATED : January 17, 1978
INVENTOR(S) : Frank J. Ball

It is certified that error appears in the above-identified patent and that said Letters Patent are hereby corrected as shown below:

In column 6, line 41, in the punctuation (second occurrence "," should read --;--.

In column 12, lines 17 and 18, "carbonate" should read --carbonated--.

In column 12, line 45, "Weighted" should read --Weighed--.

In column 13, in Table VII, line 20, under the heading MORTAR and under column heading $CO_2\%$, the number "18" should read --1.8-- (second occurrence).

Signed and Sealed this

Third Day of October 1978

[SEAL]

Attest:

RUTH C. MASON
Attesting Officer

DONALD W. BANNER
Commissioner of Patents and Trademarks